(12) United States Patent
O'Neal (10) Patent No.: US 6,711,154 B1
(45) Date of Patent: Mar. 23, 2004

(54) APPARATUS AND METHOD FOR DEVICE INDEPENDENT MESSAGING NOTIFICATION

(75) Inventor: Stephen C. O'Neal, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/240,435

(22) Filed: Jan. 29, 1999

(51) Int. Cl.⁷ .............................. H04L 12/66; H04J 3/16
(52) U.S. Cl. ........................ 370/352; 370/401; 370/465
(58) Field of Search ................................. 370/352, 353, 370/354, 356, 392, 401, 389, 465, 466, 467; 379/88.13, 88.14, 88.18, 88.23, 88.27, 201.01, 201.02; 709/223, 224, 206

(56) References Cited

U.S. PATENT DOCUMENTS

| | | | |
|---|---|---|---|
| 4,837,798 A | | 6/1989 | Cohen et al. |
| 5,327,486 A | | 7/1994 | Wolff et al. |
| 5,333,266 A | | 7/1994 | Boaz et al. |
| 5,475,738 A | | 12/1995 | Penzias |
| 5,608,786 A | | 3/1997 | Gordon |
| 5,619,648 A | * | 4/1997 | Canale et al. ............... 709/206 |
| 5,630,060 A | | 5/1997 | Tang et al. |
| 5,675,507 A | | 10/1997 | Bobo, II |
| 5,740,231 A | | 4/1998 | Cohn et al. |
| 5,742,905 A | * | 4/1998 | Pepe et al. ................... 455/461 |
| 5,790,803 A | * | 8/1998 | Kinoshita et al. ........... 709/245 |
| 5,805,587 A | * | 9/1998 | Norris et al. ................ 370/352 |
| 5,838,768 A | | 11/1998 | Sumar et al. |
| 5,870,549 A | | 2/1999 | Bobo, II |
| 5,875,302 A | | 2/1999 | Obhan |
| 5,946,386 A | | 8/1999 | Rogers et al. |
| 5,991,291 A | * | 11/1999 | Asai et al. ................... 370/352 |
| 6,023,345 A | | 2/2000 | Bloomfield |
| 6,069,890 A | | 5/2000 | White et al. |
| 6,072,862 A | | 6/2000 | Srinivasan |
| 6,148,329 A | | 11/2000 | Meyer |
| 6,233,318 B1 | * | 5/2001 | Picard et al. ............. 379/88.12 |
| 6,243,374 B1 | * | 6/2001 | White et al. ................. 370/352 |
| 6,317,485 B1 | * | 11/2001 | Homan et al. ........... 379/88.12 |
| 6,421,707 B1 | * | 7/2002 | Miller et al. ................ 709/206 |
| 6,425,006 B1 | * | 7/2002 | Chari et al. ................. 709/223 |
| 6,434,222 B1 | * | 8/2002 | Shaffer et al. ......... 379/201.02 |

FOREIGN PATENT DOCUMENTS

| | | |
|---|---|---|
| EP | 0836301 A1 | 4/1998 |
| EP | 0854655 A2 | 7/1998 |
| WO | WO 98/00787 A1 | 1/1998 |

OTHER PUBLICATIONS

EPO Search Report for Allication No. EP 00 90 8342 dated Apr. 22, 2002.

* cited by examiner

Primary Examiner—Min Jung
Assistant Examiner—Andy Lee
(74) Attorney, Agent, or Firm—Senniger, Powers, Leavitt & Roedel (57) ABSTRACT

An apparatus and method for alerting a user upon receipt of selected messages, independent of the type of device generating the message is provided. Message generating devices include telephony devices (telephone, fax machine, etc.), or data devices such as a computer or PDA. All messages are converted into a format compatible with a data network for delivery to a web server. The web server includes a message notification system with message alert type selection and incoming message filtering. A user designates, either from a computer, or from a telephone, the types of messages for which s/he wishes to be alerted, and designates one or more device types (email address, fax machine, pager number, or telephone number) to receive the alert. When messages are received by the web server, they are distinguished by message type, and filtered according to the user defined criteria. Selected messages cause a message alert to be generated to the user configured devices.

14 Claims, 9 Drawing Sheets

Figure 1 Related art telephone and data network connections

Figure 2

Data and network independent connection

APPARATUS AND METHOD FOR DEVICE INDEPENDENT MESSAGING NOTIFICATION

CROSS-REFERENCE TO RELATED APPLICATIONS

This application is related to the following U.S. Patents and co-pending U.S. Patent Applications which are hereby incorporated by reference:

application Ser. No. 09/239,560, filed Jan. 29, 1999, entitled "INTEGRATED MESSAGE STORAGE AND RETRIEVAL SYSTEM DISTRIBUTED OVER A LARGE GEOGRAPHICAL AREA";

application Ser. No. 09/240,367, filed Jan. 29, 1999 now U.S. Pat. No. 6,411,685, entitled "A SYSTEM AND METHOD FOR PROVIDING UNIFIED MESSAGING TO A USER WITH A THIN WEB BROWSER";

U.S. Pat. No. 6,263,064, issued Jul. 17, 2001, entitled "CENTRALIZED COMMUNICATION CONTROL CENTER FOR VISUALLY AND AUDIBLY UPDATING COMMUNICATION OPTIONS ASSOCIATED WITH COMMUNICATION SERVICES OF A UNIFIED MESSAGING SYSTEM AND METHODS THEREFOR";

application Ser. No. 09/239,584, filed Jan. 29, 1999, entitled "COMPUTER-IMPLEMENTED CALL-FORWARDING OPTIONS AND METHODS THEREFOR IN A UNIFIED MESSAGING SYSTEM";

application Ser. No. 09/240,893, filed Jan. 29, 1999, entitled "INTERACTIVE BILLING SYSTEM UTILIZING A THIN WEB CLIENT INTERFACE";

application Ser. No. 09/240,368, filed Jan. 29, 1999, entitled "A SYSTEM AND METHOD TO MANAGE PHONE SOURCED MESSAGES";

application Ser. No. 09/240,434, filed Jan. 29, 1999, entitled "METHOD AND APPARATUS FOR NETWORK INDEPENDENT INITIATION OF TELEPHONY";

application Ser. No. 09/240,435, filed Jan. 29, 1999, entitled "APPARATUS AND METHOD FOR DEVICE INDEPENDENT MESSAGING NOTIFICATION";

application Ser. No. 09/240,436, filed Jan. 29, 1999, entitled "APPARATUS AND METHOD FOR CHANNEL-TRANSPARENT MULTIMEDIA BROADCAST MESSAGING"; and application Ser. No. 09/239,589, filed Jan. 29, 1999, entitled "VOICE ACCESS THROUGH A DATA-CENTRIC NETWORK TO AN INTEGRATED MESSAGE STORAGE AND RETRIEVAL SYSTEM".

DEFINITION OF TERMS

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, e-mail, facsimile, page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and Internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

Thin Web Client: A commonly employed web browser such as Internet Explorer or Netscape Navigator-JAVA enabled.

PSTN: Public Service Telephone Network, e.g., AT&T, MCI, Sprint-owned telco

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

BACKGROUND OF THE INVENTION

1. Field of the Invention

This invention relates in general to the fields of telephonic and data communication, and more specifically to a notification system for alerting a user of received messages, regardless of what type of device generated the message.

2. Description of the Related Art

The term telephone (from the Greek roots tele, "far," and phone, "sound) was the first used to describe any apparatus for conveying sound to a distant point. Specifically, the word was applied as early as 1796 to a megaphone, and not long afterward to a speaking tube. The name string telephone was given some years after its invention (1667) to a device in which vibrations in a diaphragm caused by voice or sound waves are transmitted mechanically along a string or wire to a similar diaphragm that reproduces the sound. Still later, devices employing electric currents to reproduce at a distance the mere pitch of musical sounds were called telephones. Nowadays, the name is assigned almost exclusively to apparatus for reproducing articulate speech and other sounds at a distance through the medium of electric waves. The term telephony covers the entire art and practice of electrical speech transmission, including the many systems, accessories, and operating methods used for this purpose. Telecommunications broadens the concept still further to cover all types of communication including computer data, voice and facsimile.

In 1876, Alexander Graham Bell successfully transmitted words using a variable resistance transmitter. In the $19^{th}$ century, a very short time after the introduction of Bell's device, telephony provided connections to a relatively large number of users over relatively short distances. Today, telecommunications networks encompass a number of differing technologies just to establish a voice connection from point A to point B. For example, an end user is usually connected by way of a loop (twisted pair) to a local telephone exchange. The local exchange is then connected via a hierarchy of switching centers. The connection between the centers is called a trunk, which consists physically of cable, coax, fiber optic or microwave radio links. To connect from an end point in one city to an end point in another city the order of connection is as follows. The first end point connects with a local toll center, which in turn connects to a primary center. If the receiving end point is managed by this primary center, the call is directed to a local toll center for the recipient, and ultimately to the receiving end point. If the primary center does not manage the receiving end point, the call is passed to a sectional center. The sectional center then passes the call to a regional center to be passed back down to another sectional center, then to a primary center, and eventually to the local center responsible for the recipient end point.

Once a call leaves the local center to reach a recipient end point, the call is tagged as long distance, and the user who initiates the call is charged. Thus, for all long distance voice communication today, a user will be billed for the connection, by a long distance company who has contractual rights for time on the trunks.

In contrast to this scenario, modern data communications between computers is typically provided via data networks, rather than telephone networks, for which cost is associated more closely with the speed at which connection is made, and the amount of data that is being transferred. That is, end to end connection between computers is provided over a relatively cost free data network, commonly referred to as the Internet. However, the types of connections available over the Internet are typically associated with computer data types such as email, web pages, etc. Although some development has been made to encode voice information for transfer over the Internet, unified messaging (voice, email, fax) over a data network is still unavailable. In addition, even where voice, email and fax messaging is available, there is a strict correlation between end point communication devices that must be maintained. That is, a telephone must communicate with another telephone, a fax machine with another fax machine, and an email client with another email client. So, a voice capable computer is unable to communicate with a remote telephone, because the two devices are communicating over separate networks (telephone and data).

What is needed is a method and apparatus that allows communication devices to be connected, regardless of the type of device desiring the connection, and regardless of the typical network upon which the device communicates.

Furthermore, as multiple device types are coupled together over a data network, it is possible that a user will wish to access all of his/her messages, regardless of message type, via a unified system, from either a computer or telephone. Since multiple message types (email, voicemail, fax) will all be received within a unified messaging system, what is needed is the ability to alert a user of a message received, without regard to the type of end device generating the message. That is, the user should have the capability of configuring his/her communication system to alert him/her upon receipt of messages, whether fax, voice or email, in any desired form, such as fax, voice, email, pager, etc.

SUMMARY

To address the above-detailed deficiencies, the present invention provides a web based message alert system that includes a local point of presence (POP) server coupled to a plurality of message sending devices, and a device independent message notification system coupled to the POP server. The message notification system includes message alert type selection, and incoming message filtering, configurable by a user. The system also includes a plurality of receiving devices, coupled to the message notification system, for receiving a message alert according to the message alert type selection.

In another aspect, the present invention provides a message notification system, coupled to a data network, for receiving a plurality of messages originating from a plurality of different message sending devices, and for notifying a plurality of receiving devices upon receipt of selected ones of the plurality of received messages. The system includes a web server and message notification. The web server is coupled to the different message sending devices, to receive the messages. The message notification is coupled to the web server to obtain the selected ones of the received messages using user definable criteria, and for generating a message alert. The web server receives the message alert, and provides the message alert to the receiving devices utilizing the data network.

In another aspect, the present invention provides a method for alerting a user upon receipt of selected ones of a plurality of messages, the plurality of messages being generated from a plurality of telecommunication devices, the method alerting the user via the plurality of telecommunication devices according to user selectable criteria. The method includes receiving the plurality of messages via a data network; distinguishing between the plurality of received messages according to message type; selecting the ones of the plurality of messages according to the message type; and alerting the user upon receipt of the selected ones of the plurality of messages using any of the plurality of telecommunication devices.

In a further aspect, the present invention provides a method for selectively alerting a user of a received message, the message being filtered according to pre-selected criteria, the user alerted via a pre-selected telecommunication device. The method includes: providing a data server for recognizing received messages from different device types; filtering the received messages according to the pre-selected criteria defined by the user, the filtering distinguishing between the different device types; and alerting the user via the pre-selected telecommunication device, the pre-selected telecommunication device being selected from alert receiving device types; where the type of pre-selected telecommunication device receiving the alert is independent of the different device types from which the received messages originate.

BRIEF DESCRIPTION OF THE DRAWINGS

These and other objects, features, and advantages of the present invention will become better understood with regard to the following description, and accompanying drawings where.

DETAILED DESCRIPTION

Figure 1:
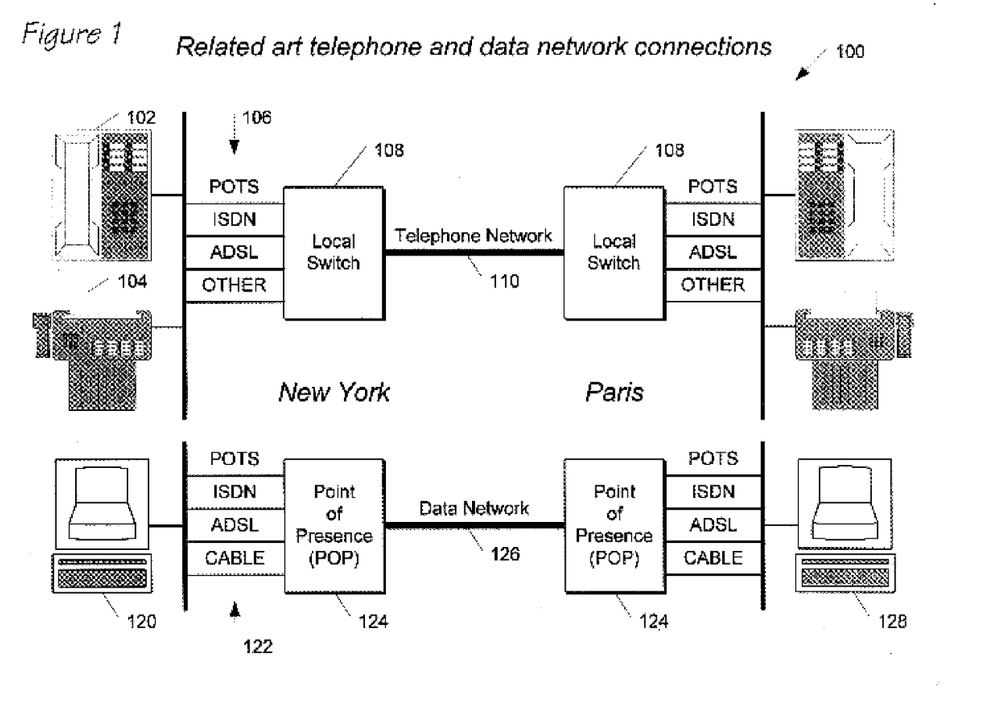
FIG. 1 is a block diagram of both a telephone network and a data network interconnecting end points between two cities.

Referring to FIG. 1, a block diagram 100 is shown of a related art telephone network 110 and a related art data network 126. The telephone network 110 provides for transmission of communication between local switches 108, which are connected to telephony devices, such as a telephone 102 or a fax machine 104. One skilled in the art will appreciate that the telephone network 110 between the local switches 108 may consist of land lines (coax or fiber optic), line of sight microwave, or even satellite communications. However, from the local switch 108 to the end communication devices 102, 104, connections are typically made via a twisted pair, referred to as plain old telephone service (POTS). More recent communication channels from the local switch 108 provide for faster and cleaner transmission. These include Integrated Digital Service Network (ISDN) and Asynchronous Digital Subscriber Line (ADSL) technologies. These technologies, however, still communicate between essentially voice front ends, to a local switch 108, for access to the telephone network.

In operation, if an end user wishes to place a telephone call, s/he initiates the call using a telephone 102. The telephone 102 passes the telephone number to be called through the local switch 108, ultimately reaching a telephony device at the receiving end. At both ends of the call, communication is provided by the local switches 108. If the call is local, the caller is typically charged a single monthly fee and does not incur per minute charges for the time s/he spends on the telephone. However, if the caller that initiates the conversation is in say, New York, and the recipient of the call is in Paris, the caller that initiates the conversation is typically charged a long distance fee, from a long distance provider who either owns, or leases access to the telephone network 110.

If the type of information to be transferred is neither voice, nor fax, but is instead computer generated electronic information, communication between devices may be established over a data network 126. Examples of data networks 126 include local area networks (LAN's), wide area networks (WAN's), and the Internet. If the Data network is a LAN or a WAN, access to the network is typically provided via a hub or router (not shown) connected to one or more data servers (not shown). However, if the connection desired is outside of the LAN or WAN, communication is generally provided via typical telephone connections 122 (as above), coupled to a point of presence (POP) server 124. The POP server 124 is coupled to a data network 126, such as the Internet.

In operation, if a computer 120 wishes to communicate to a second computer 128, a connection between the computers 120, 128 is established via POP servers 124 over the data network 126.

While the telephone network 110, and the data network 126 are schematically shown in FIG. 1 with similarities, the type of information that is transmitted over the networks is very different. The telephone network 110 is optimized to carry primarily bi-directional voice communication (albeit digitized), while the data network 126 is optimized to transmit and receive computer data, asynchronously. The telephone network 110 does provide for transfer of information other than voice, but the devices that communicate over the telephone network 110, such as the fax machine 104, have been specifically designed to accommodate the essentially analog nature of the service.

In addition, when communicating from New York to Paris over the telephone network 110, a call initiator must contract for, and pay a long distance carrier for the privilege. In contrast, a computer user in New York can communicate with a computer in Paris, for example, without incurring any long distance charges. In fact, the only charges that will be incurred by computer user will be local telephone line charges to connect to his/her local POP 124. But, communication from the local POP 124 to any other POP 124 in the world is cost free to the user. This has made communication over the data network 126 very desirable. However, at present, the types of communication provided for via the data network 126 are predominantly for computer data (i.e., communication from computer to computer).

Also, while not shown in FIG. 1, it should be appreciated by one skilled in the art that calls from devices 102, 104 to other similar devices are not established unless the similar end devices are answered. Of more recent development are answering systems (not shown) connected to the telephone network to store particular message types, either voice or fax. In contrast, communication via email over data networks provides for message storing and retrieval without requiring two computers 120, 128 to be simultaneously connected to each other. Thus, data networks provide for asynchronous communication between computers, while telephony devices require some sort of answering device, or messaging service that is device specific.

Figure 2:
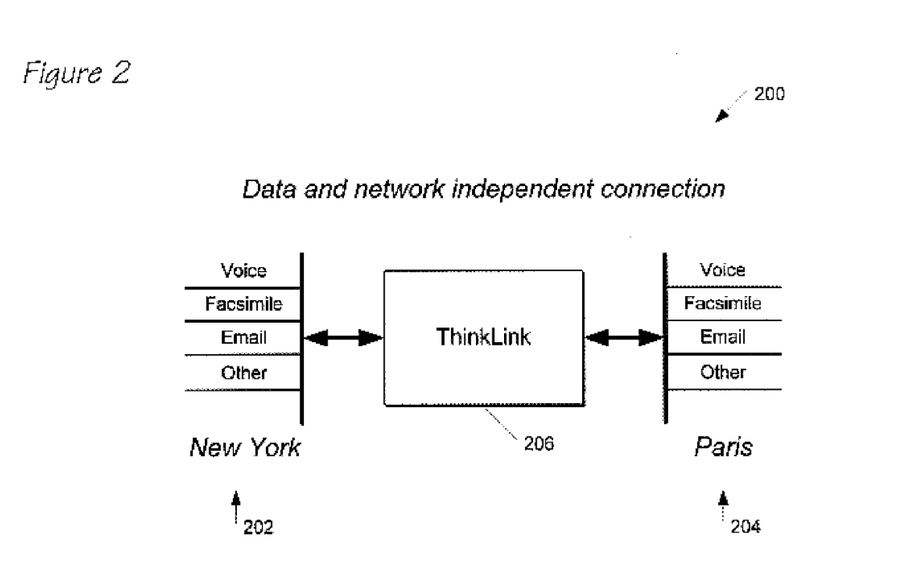
FIG. 2 is a block diagram of a network independent communication channel according to the present invention.

Referring now to FIG. 2, a block diagram 200 is shown illustrating the present invention which provides for communication between endpoints 202 and 204 that is essentially independent of either data type, or network type. Each end point 202, 204, say New York and Paris, may communicate with each other in any of a number of data types, such as voice, facsimile, email, or other analog or digital form, using end devices such as a telephone (analog or cell phone), fax machine, computer, personal digital assistant (PDA), or other device, via a ThinkLink interface 206. In addition, the device type at one endpoint 202 need not correspond to the device type at another endpoint 204. That is, the ThinkLink interface 206 allows bidirectional communication to be established between say a telephone and a computer. In addition, the ThinkLink interface 206 dynamically converts information into an appropriate format depending on how the user requests the information, regardless of the original format of the information. For example, if the information at one end of a connection is transmitted via email, and the user requests the email via a telephone, the email is dynamically converted to voice. Or, a user may wish to have faxes delivered via email, rather than to a physical fax machine. The ThinkLink interface 206 therefore not only connects all device types to a data network for delivery, but also provides conversion of differing data types, as specified by a user. This will be more particularly illustrated below with reference to FIG. 4. Furthermore, if an endpoint device does not answer, a messaging system within ThinkLink will store the message, regardless of message type, for later retrieval by a user. The ThinkLink interface 206 is more particularly illustrated in FIG. 3, to which attention is now directed.

Figure 3:
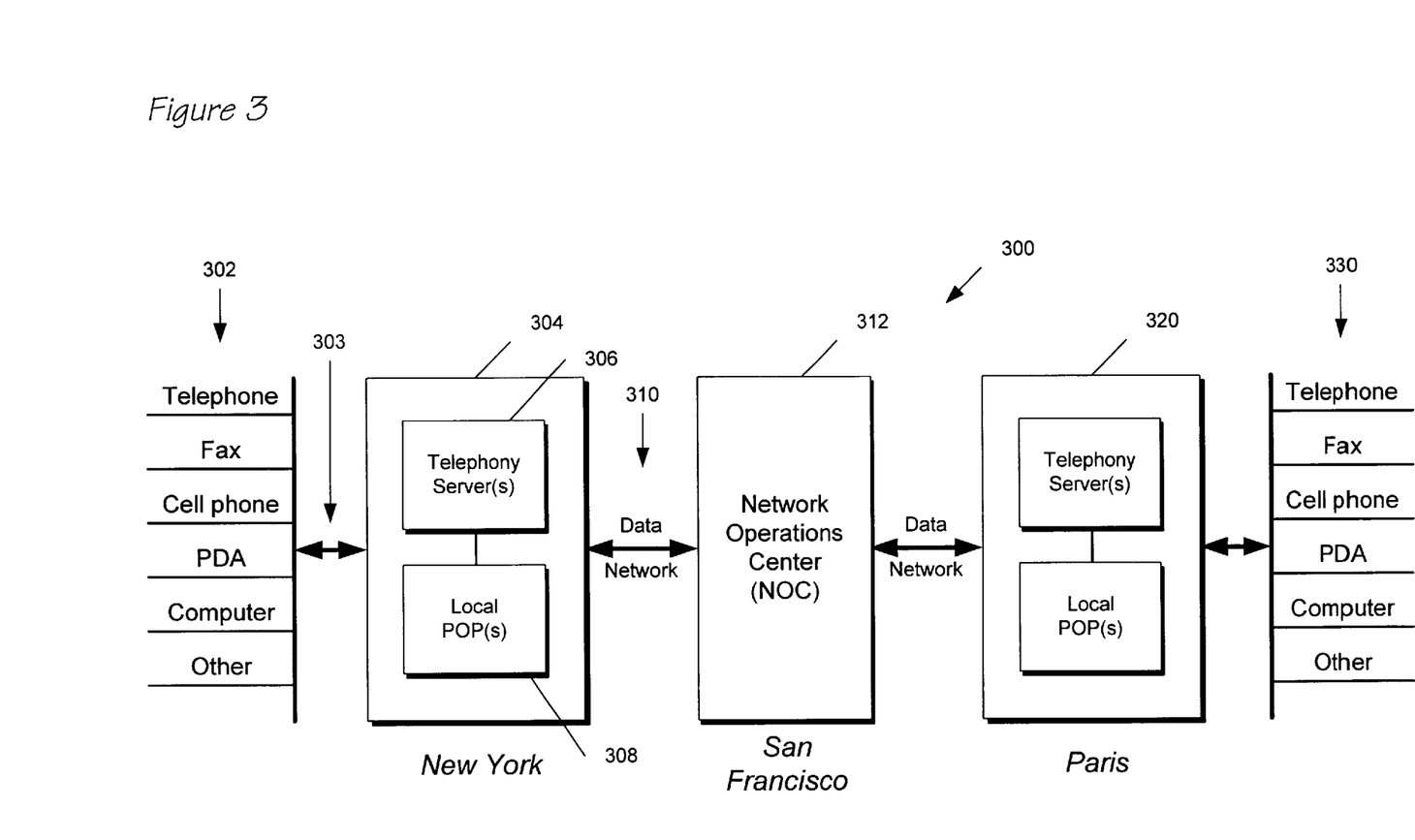
FIG. 3 is a block diagram of a data network communication system according to the present invention.

FIG. 3 provides a block diagram of the ThinkLink interface 300. More specifically, the block diagram 300 illustrates a number of different communication devices 302 coupled to a communications server 304 via modern voice or data connections 303. For example, the connection to the communications server 302 from the communication devices 302 could be POTS, ISDN, ADSL, cable modem, LAN or WAN. The communication devices 302 include telephone, fax, cell phone, personal digital assistant (PDA), computer, or any other telephony or data device compatible with existing or future telephone or data networks. The communications server 304 is then coupled to a network operations center (NOC) 312 via a data network 310. A second communications server 320 is shown connected to the NOC 312 via a data network to illustrate connectivity between the devices 302 and other remote devices 330. One skilled in the art will appreciate that while only two server connections are shown to the NOC 312, many other connections are provided. In fact, the number of data connections provided by the NOC 312 is essentially without limit, albeit concurrent connections may be limited by the bandwidth of the data network 310.

Within the communications server 304 are a telephony server 306 and a data server, or local POP 308. The telephony server 306 and the data server 308 may be provided by a single computer executing two applications (telephony and data), or in the alternative, may be two or more distinct computers executing their own applications (telephony and data). In fact, the configuration of the telephony and data servers 304, 306 may very from location to location depending on the number of communication devices requiring access to the communications server 304.

In operation, communication devices 302 that typically communicate over existing telephone networks (telephone, fax, etc.) connect to the communications server 304 via the telephony server 306. Other devices 302 that communicate over an existing LAN, WAN, etc., may communicate directly to the data server 308. However, once a communication device 302 connects to a local communications server 304, whatever the type of communication (voice, fax or data), all communication is routed over the data network 310 through a network operations center 312 in the form of Internet data. For example, if a user in New York using a voice capable computer wished to call a telephone in Paris, a connection between his computer 302 and his local data server 308 would be established. The call would be routed through a NOC 312, in San Francisco for example, and then over the data network to a local communications server in Paris. A call would then be placed by the telephony server in Paris to the telephone in that city. Voice communication would then be established over the data network 310, through the NOC 312, from New York to Paris. One skilled in the art should appreciate that this voice connection, established over the data network 310, is essentially cost free in terms of long distance charges to the user by a telephone company, presuming the user has established access to the data network, via an Internet service provider, for example.

Figure 4:
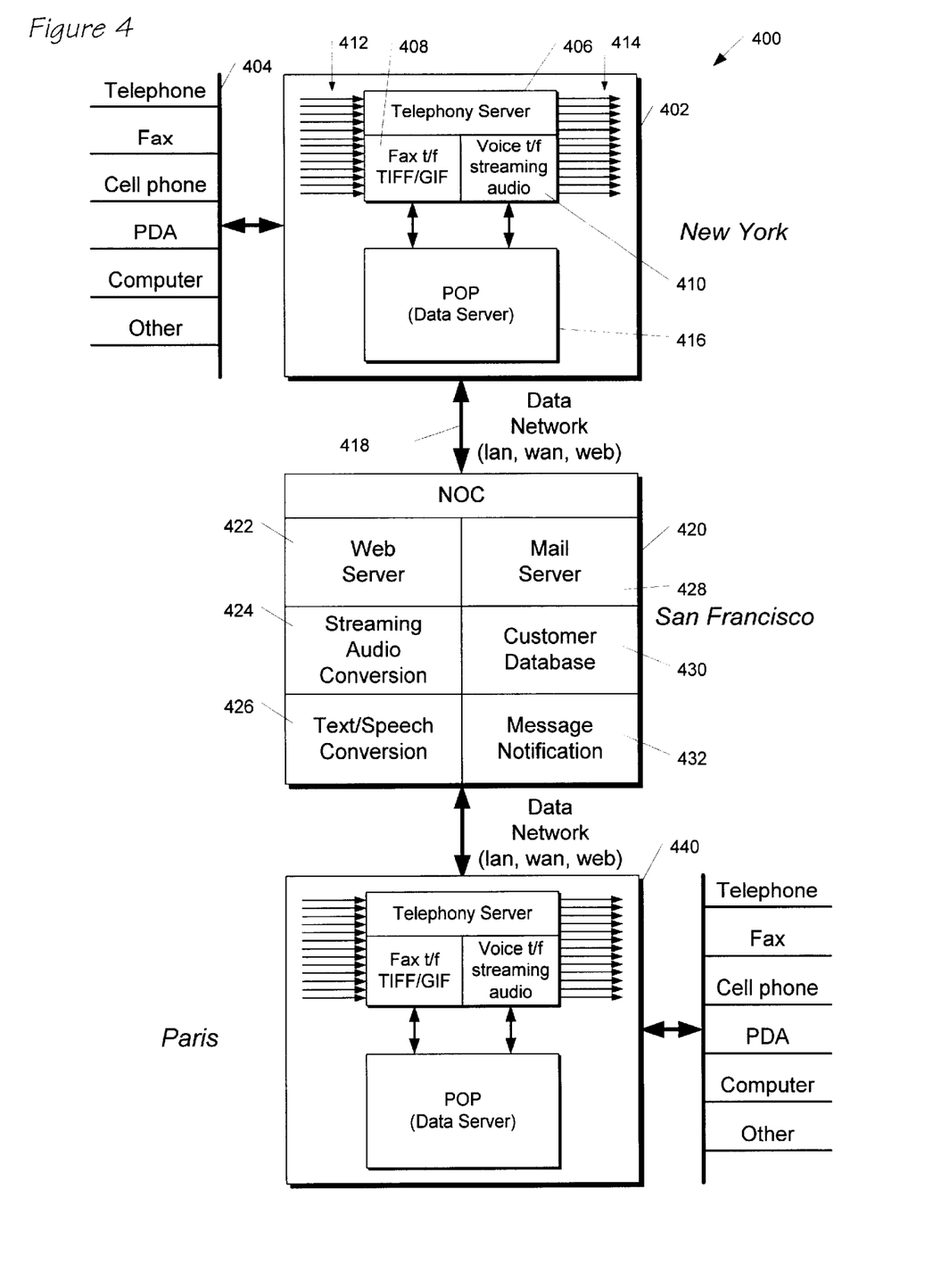
FIG. 4 is a block diagram illustrating connection of remote point of presence (POP) servers with a network operations center (NOC), according to the present invention.

Referring now to FIG. 4, a more detailed block diagram of a ThinkLink interface 400 is shown. The diagram 400 illustrates a number of different communication devices 404 connected to a communications server 402. The communications server 402 is coupled to a NOC 420 via a data network 418. The NOC 420 is also connected to other communications servers 440 via the data network 418. Within each communications server 402 are a telephony server 406 and a data server 416. The telephony server 406 is connected to typical phone connections (i.e., twisted pair, coax, T1, etc.) to provide connection between the communication server 402 and communication devices 404 that typically communicate over a telephone network. Such devices include telephones, fax machines, cell phones, etc. In one embodiment, a telephony server 406 is coupled to 2 T1 lines providing access to 48 phone lines, for inbound 412 or outbound 414 communication. These 48 phone lines may be dedicated to voice, fax, pager, etc., or may be dynamically allocated as demand varies. Within the telephony server 406 are two conversion applications: a Fax to/from TIFF/GIF converter 408, and a voice to and from streaming audio converter 410. The Fax converter 408 is capable of taking a fax that has been received by the telephony server 406, and convert the fax images into either TIFF or GIF format, for transmission over the data network 418. In addition the fax converter 408 can receive text formatted files from the data network 418 and convert them into a fax format for transmission by the telephony server 406 to a fax device 404.

The voice converter 410 converts voice information received from the telephony server 406 into digital format (streaming audio or another audio format such as VoIP (H.323) for transmission over the data network 418. In addition, digital audio received from the data network 418 is converted into voice format for delivery by the telephony server 406 to a voice capable device 404 (such as a telephone or voice capable computer).

By using the fax converter 408 and the streaming audio converter 410, the telephony server 406 provides bi-directional transmission of information between typical telephony devices 404 and other remote devices accessible via a data network 418 (such as a LAN, WAN or Internet).

The NOC 420 contains a web server 422, a streaming audio converter 424, a text/speech converter 426, a mail server 428, a customer database 430, and message notification 432. Each of these will be discussed in greater detail below.

The web server 422 provides a front end interface for a user with a data connection to the NOC 420. The web server 422 allows a user to configure and control telephony and data connections from any device capable of accessing the Internet (such as a computer, a set top box, etc.). Examples of such controls will be discussed below with reference to FIGS. 6–9.

The streaming audio converter 424 provides a user with the ability to convert data received in digital audio format into other formats that s/he prefers. One example would be Real Audio format. The audio converter 424 has the ability to convert analog voice data received from the public switch telephone network (PSTN) into digital voice data. Voice data intended for delivery over a data network is typically converted to H.323 format; voice data being stored for later retrieval is typically converted to VOX format. Once the data is digitized, it can then be manipulated into alternate formats depending on the delivery/retrieval method. Thus, if a user desired to receive voice information in the form of Real Audio sent to his/her computer, the streaming audio converter 424 would convert the information to Real Audio format prior to delivering it to the user's local communications server 402.

The text/speech converter 426 provides the ability to convert text, such as email, into digital audio format, or audio format into text. Operationally, this allows a user to have email converted to voice information for delivery to a telephone, for example. Alternatively, information transmitted by a user in the form of voice, and ultimately digital audio format, could be converted to text for delivery as an email.

The mail server 428 provides an email interface for a user to send/receive email, either from an account established on the NOC 420, or alternatively to poll another email account for maintenance by the NOC 420. For example, a user may have an email account on the NOC at address joe@thinklink.com. In addition, the user may have another email account as joe@isp.com. The mail server 420 provides the user with the ability to receive all joe@thinklink.com email, and can also poll an external server to obtain mail delivered to joe@isp.com.

The customer database 430 provides information within the NOC 420 regarding rules, address books, and other configuration information related to a particular user of ThinkLink. Such information will be described below with reference to FIG. 6.

The message notification 432 provides for storage, retrieval, message filtering, and alert notification of received messages, according to user defined criteria. Specifics of the message notification 432 will be provided below with reference to FIGS. 7–12.

To recap, the ThinkLink interface 400 provides the ability to communicate between remote devices, that may create data in different formats (voice, email, etc.), over a data network 418, without incurring long distance charges associated with the telephone network. In addition, the ThinkLink interface provides a user with the ability to communicate between remote end devices directly from the data network. Furthermore, ThinkLink allows a user to configure how messages are stored, and how they are delivered to him/her, regardless of the type of device generating the message. An example of this will now be described with reference to FIG. 5.

Figure 5:
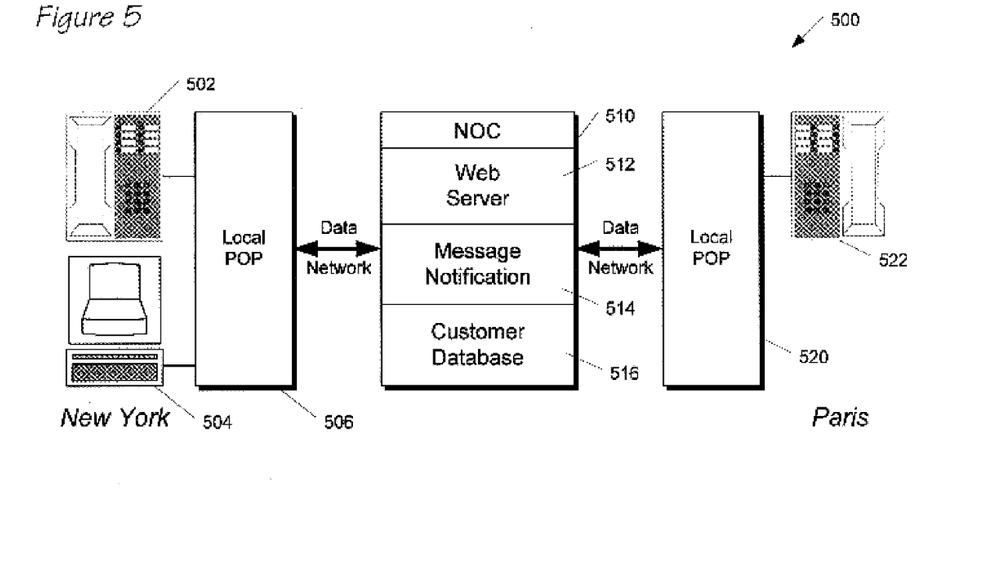
FIG. 5 is a block diagram illustrating data network initiated telephony according to the present invention.

Referring to FIG. 5, a block diagram 500 is shown of communication devices 502, 504 and 522 connected via a ThinkLink interface. More specifically, a telephone 502 and a computer 504, located in New York, are connected to a local data server 506. The telephone 502 and the computer 504 may be connected to the local data server 506 over separate POTS lines, over a single ISDN line, or perhaps distinctly, such as by connecting the telephone 502 over a POTS line, and the computer 504 via a cable modem. The local server 506 is similar to that described above in FIG. 4. The local server 506 provides connection for the telephone 502 and the computer 504 to a NOC 510, and thus to any other communication device, via the data network.

The NOC 510 contains a web server 512, message notification 514, and a customer database 516. Other elements of the NOC 510 have been left out of FIG. 5 for ease of discussion. Operationally, if a user at a computer 504 in New York wished to establish voice to voice communication between his/her telephone 502, and a telephone 522 in Paris, the following sequence would occur. The user would select the two telephone numbers to be dialed, one associated with the telephone 502, the other associated with the telephone 522. The user selects these numbers from a customer database 516 via connection to the NOC 510 from his/her computer 504, or enters the numbers directly. Once the numbers are selected or input, the user initiates the call. The NOC 510 establishes a data connection with the local server 520 in Paris and the local server 506 in New York in one of two ways. First, the NOC 510 may instruct the New York POP 506 to dial the local New York number. Once the local connection is established, the New York POP 506 directly dials the Paris number. Or second, the NOC 510 may instruct the New York POP 506 to dial the local New York number. Once the local connection is established, the New York POP 506 sends a request to the Paris POP 520 to dial the local Paris number. Once both local connections are established, the New York and Paris POP's 506, 520 communicate the voice data between each other using standard voice over Internet Protocols (e.g., H.323). More specifically, the voice information provided by each telephone 522 is converted into digital audio, transmitted over the data network to the other data server, converted back to voice format, and provided to the end device. In this scenario, the telephone conversation was initiated by the computer 504, over a data network.

An alternate example would be the following. A user in Paris could connect to their local POP from his/her telephone 522 and would select the address they wished to contact either by typing it in or by selecting it from an address list. The local POP would then connect to the computer and transfer data using standard voice over Internet protocols. If a user were sitting at the computer 504, a voice connection could be established with the user in Paris, via the data network.

In both of these examples, communication between end points is initiated and controlled by a server on a data network, rather than by a long distance telephone network. In addition, the type of the device initiating the communication is not restricted to telephony devices, but also extends to any device interfacing to the web server 512.

In both of these examples, it is possible that either of the end devices called by the NOC 510 do not answer. When this occurs, the message notification 514 allows a caller (whether the call is a telephone, or fax device, for example) to leave a message. The message is stored within the message notification 514 for later retrieval by a user.

Figure 6:
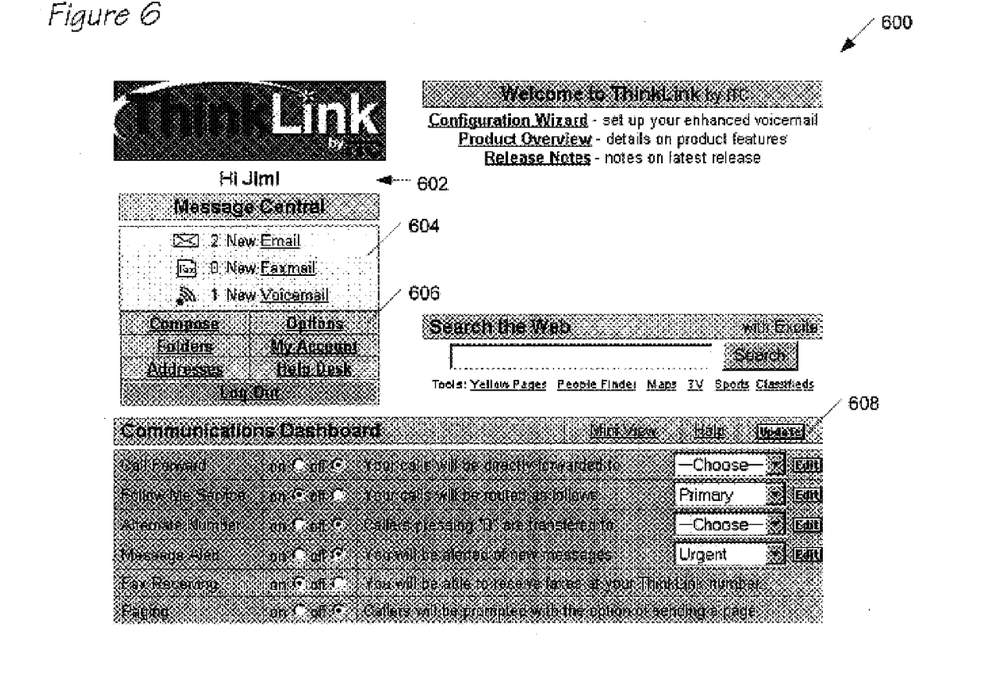
FIG. 6 is a screen capture of a display interface of the ThinkLink services according to the present invention.

An exemplary interface to the web server 512 will now be described with reference to FIGS. 6–10 to which attention is now directed. FIG. 6 contains a screen shot 600 of the ThinkLink web interface. Access to the web server 512 may be provided by any device capable of connecting to the Internet. Such devices now include personal computers, PDA's and set top boxes, but others are anticipated in the future.

Once an account is established with ThinkLink, a user logs onto the web server 512. Note: an account typically provides a user with a telephone number, a fax number, and an email address. These contact numbers, and email address may then be provided to friends, family, clients, etc., to reach the user. If the user is not available, messages, in the form of voicemail, fax or email may be left with the web server 512.

When a user logs onto the web server 512, the server 512 queries the database and returns to the user an HTML page that indicates the type (voicemail, fax, email) and number of unviewed messages the user has in the system. If the user wishes to examine new messages, s/he simply clicks on the corresponding hyperlink text, and is taken to a message area applicable to the message type. Alternatively, if a user calls in to their local POP, the POP queries the web server 512 and returns a series of menu prompts that indicate the type (voicemail, fax, email) and the number of unviewed messages the user has in the system. In FIG. 6, Jim is shown to have 2 new email messages, 1 new voice message, and 0 faxes.

Below the message control 604 are menu commands 606. These allow a user to configure ThinkLink to manage his/her account according to predefined criteria.

In addition, a communications dashboard 608 is provided. The communications dashboard 608 allows a user to configure how the telephony server is to act when receiving messages. For example, if a user receives a telephone call to his/her ThinkLink number, he can have it automatically forwarded to a different telephone. If the user is traveling, for example, upon arrival at each destination, the user could access his configuration, via a computer or a telephone, and could change his configuration to forward all calls to his new destination.

Alternatively, a user may wish for ThinkLink to record messages, either fax, email or voice, but may wish to be alerted via pager, email, fax, or telephone when particular messages arrive. This feature will now be particularly described, beginning with reference to FIG. 7.

Figure 7:
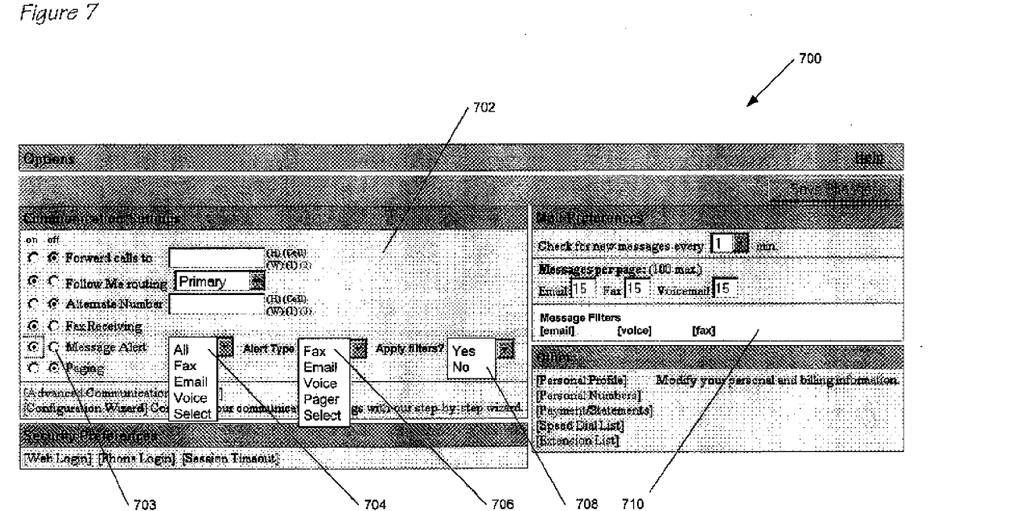
FIG. 7 is a screen capture of a display interface illustrating the message alert features within the ThinkLink service.

Referring now to FIG. 7, a screen shot 700 is shown of communication settings accessed via the options link 606 on the screen 600. The screen 700 includes communication settings 702, message alert selection boxes 704, 706 and 708, and message filters 710. The communication settings 702 allow a user to selectively configure whether voice/fax calls are routed to alternative telephone numbers, and/or whether the calls are recorded within the message notification 514.

In addition, a message alert button 703 is provided to allow a user to selectively turn on/off a message alert feature of ThinkLink. More specifically, a user can turn on message alert via button 703. The user is then provided with drop down boxes 704, 706, 708 to configure when and how s/he is to be alerted. For example, drop down box 704 allows the user to select the types of messages for which s/he wishes to be alerted. These include all message types, faxes only, email only, voicemail only, or a select combination between these. One skilled in the art should appreciate that as new message types are developed, they can be included within the alert engine of the present invention. For example, if a user wished to be alerted any time s/he received a fax, s/he would select the fax option on drop down box 704.

Once message alert 703 is turned on, and a message type 704 is selected, the user can configure how s/he wishes to be alerted via drop down box 706. Drop down box 706 illustrates four alternative message alert types: fax, email, voice, and pager, or any combination of these. For example, a user may wish to be paged upon receipt of any fax. The user would select fax in box 704, and pager in box 706. Then, upon receipt of any fax, message notification 514 would cause the user's pager to be called.

Furthermore, in addition to selectively enabling alert messages to be generated based on message type, filters may be used to further qualify or distinguish between received messages. Filter selection is made via drop down box 708. When filtering is turned on, a user is given the opportunity to enter filtering, based on message type, via box 710.

Figure 8:
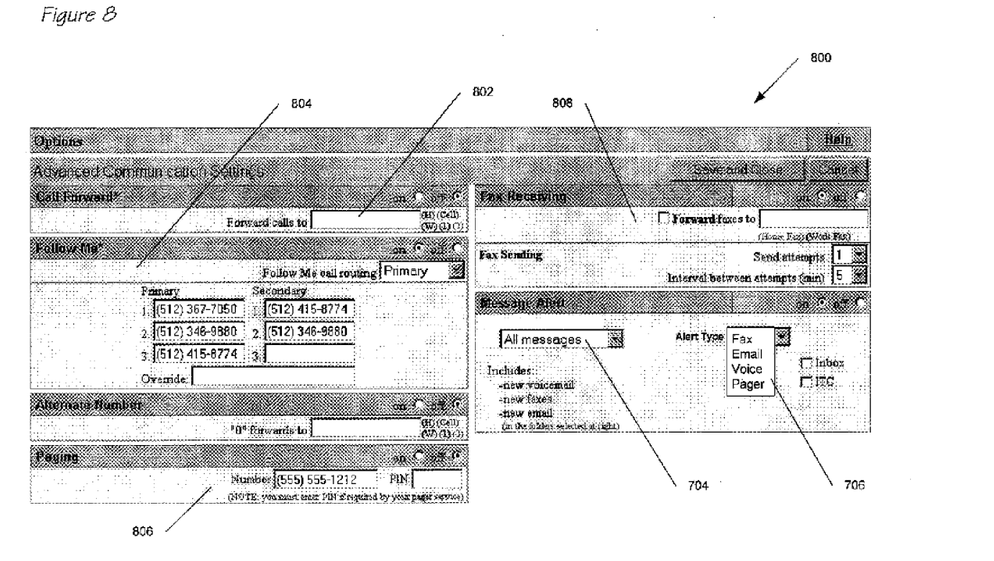
FIG. 8 is a screen capture of a portion of a display illustrating additional message alert features within the ThinkLink service.

Referring now to FIG. 8, a screen shot 800 is shown which illustrates how a user enters specifics regarding the communication settings selected in box 702 of FIG. 7. More specifically, telephone numbers for call forwarding are entered in box 802. Telephone numbers for follow me routing are entered into box 804. A pager number (and PIN) are entered into box 806. Fax forwarding numbers are entered into box 808. In addition, the selection boxes 704 and 706 are repeated in screen 800 for ease of use.

Figure 9:
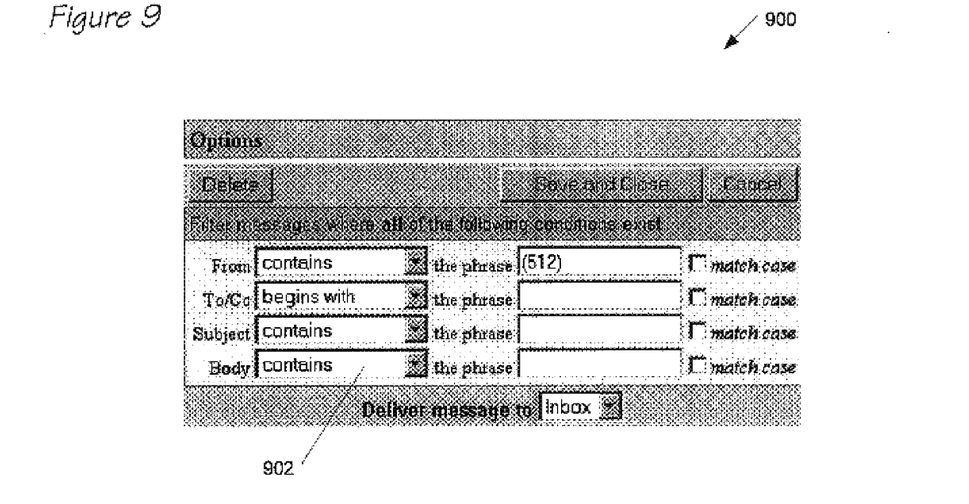
FIG. 9 is a screen capture illustrating alert filtering options embodied within the ThinkLink service.

Referring now to FIG. 9, a screen shot 900 is shown of the filtering options accessed via the selection box 710. The screen 900 is shown for email and voice mail message types, but a similar box may be provided for fax messages. Within the screen 900 are user definable criteria 902 for distinguishing between messages. For example, if the message type is voicemail (or fax), a user could specify a filter to select only those messages originating in area code 512. If such a designation is made, and filtering is turned on (via box 708), using the examples above with Reference to FIG. 7, a user would be alerted via his pager when a fax is received that originated from area code 512. Of course, other criteria is available for filtering such as who the message is being sent to, whether a message subject is available (for voice or email, for example), and whether the body of the message contains particular text (for email or fax, for example).

Figure 10:
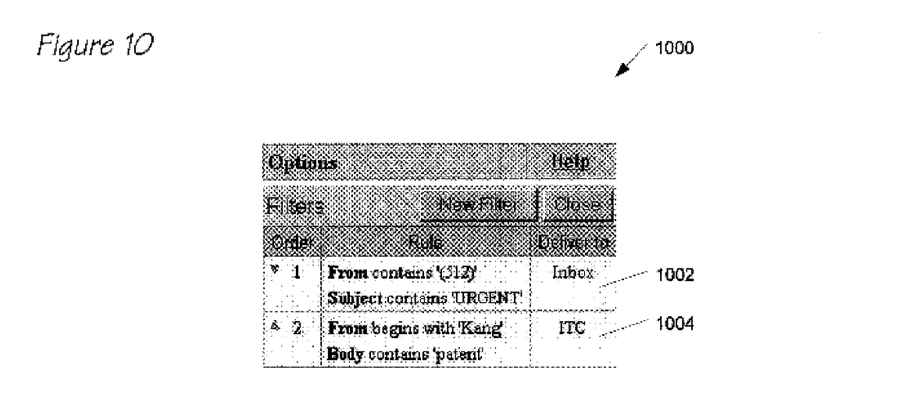
FIG. 10 is a screen capture illustrating a filter summary of alert filters created within the ThinkLink service.

Referring now to FIG. 10, a screen capture 1000 is shown that summarizes filters that have been created for incoming messages. A first filter 1002 is created for voice mail originating in area code 512 that contains urgent within the subject box. A second filter 1004 is created for email with a sender's name of "Kang", where the body of the email contains the word "patent". Either or both of these filters may be applied to distinguish incoming messages for the purpose of alerting a user.

The above description of FIGS. 6–10 provide one embodiment for entering message alert options into ThinkLink. One skilled in the art will appreciate that it is not the interface that is important. Rather, it is that message alerts may be generated for one or more receiving devices, upon receipt of any message, voice, fax or email, based either on message type, or on further criteria established via filters applied to received messages. The methodology incorporated into the message notification 512 is particularly illustrated in FIG. 11, to which attention is now directed.

Figure 11:
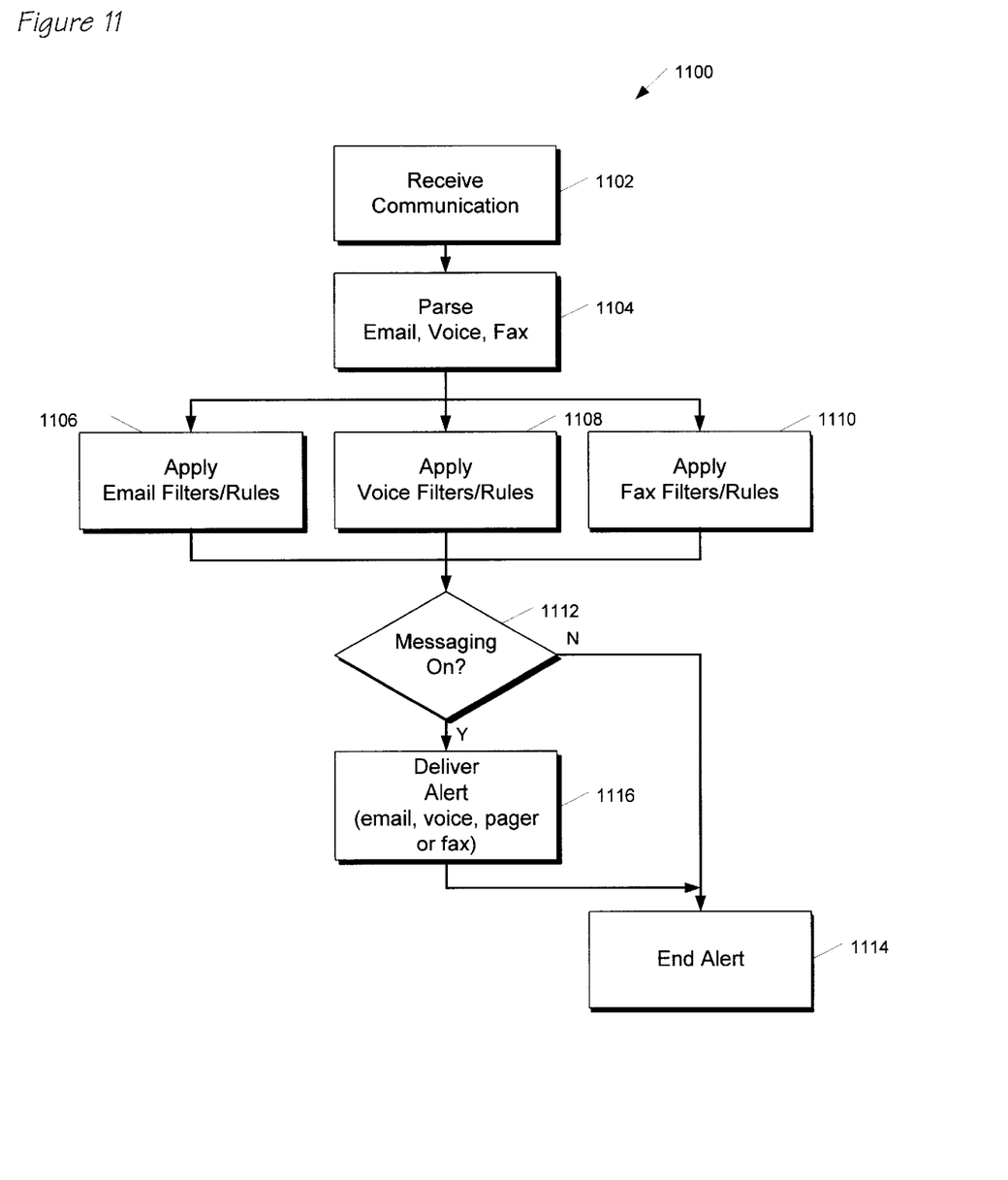
FIG. 11 is a flow chart illustrating the alert methodology embodied within the ThinkLink service.

Referring to FIG. 11, a flow chart 1100 is provided to illustrate the message notification methodology incorporated within ThinkLink. Flow begins at block 1102 upon receipt of a communication (whether voice, fax or email), and proceeds to block 1104.

At block 1104, a determination is made as to whether the received message is an email, voicemail or fax. The message is then forwarded to one of the blocks 1106, 1108 or 1110.

At blocks 1106–1110, filters applicable to the message types are applied. Flow then proceeds to decision block 1112.

At decision block 1112 a determination is made as to whether messaging is turned on. If not, then message alert ends, at block 1114. Otherwise, flow proceeds to block 1116.

At block 1116, the user is alerted of the received (and filtered) message, according to criteria defined in FIG. 7.

Figure 12:
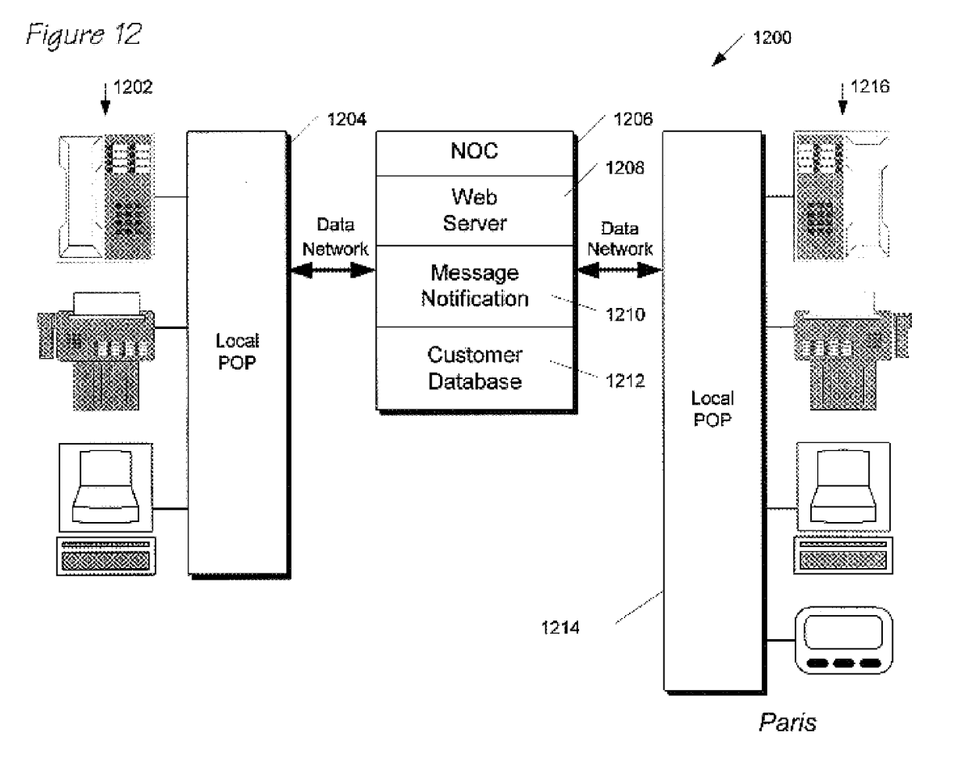
FIG. 12 is a block diagram of a network according to the present invention illustrating device independent alerting according to the present invention.

Referring to FIG. 12, a block diagram 1200 is shown, similar to that described above with reference to FIG. 5. The diagram 1200 includes a number of different calling devices 1202 connected to a local data server 1204 in New York, and a data server 1214 in Paris, for example. When a call is made from any of the devices 1202 (fax, phone or email), and the message notification 1210 receives the message, the message notification determines whether an alert is to be provided, and if so, to what messages. If an alert is to be provided the message notification determines how the alert is to be provided (email, fax, pager, for example), and delivers the alert to the appropriate data server 1214. The receiving device specified by the user receives the alert to notify the user that a particular message, based on message type, or other criteria, has been received. The user can then connect to the ThinkLink web server 1208, either from a computer or telephone, and can retrieve the message.

Although the present invention and its objects, features, and advantages have been described in detail, other embodiments are encompassed by the invention. For example, the discussion above with reference to FIGS. 6–12 illustrate message origination from telephones, faxes, or computers, and alert a user, based on message type and filtering, via pager, telephone, fax or email. Other communication options are possible for either incoming messages, or alerts. What is particularly novel is that a unified messaging system, with alert features is provided over a data network, without regard to the type of device generating the message, or the type of device with which the user desires to receive the alert.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method of supporting device independent messaging notification, the method comprising:
   receiving a plurality of communications, including telephony, email and facsimile communications, on behalf of users via a telephony server and first and second point of presence (POP) data communications servers;
   converting all received communications, including said telephony, email and facsimile communications, as necessary into a format compatible with a data network linking said POP data communication servers;
   routing all of said converted telephony, email and facsimile communications through the POP data communications servers via the data network to a message notification system;
   generating message alerts in the message notification system according to settings defined by said users; and
   routing the message alerts through the POP data communication servers via the data network to communication devices associated with said users.

2. The method of claim 1 further comprising receiving the settings defined by said users.

3. The method of claim 2 wherein receiving the settings defined by said users includes receiving said settings via a web server.

4. The method of claim 2 further comprising allowing said users to specify one or more types of messages for which message alerts should be generated.

5. The method of claim 4 wherein said one or more types of messages include facsimile, email and voicemail messages.

6. The method of claim 1 further comprising recording messages for said converted communications in the message notification system.

7. The method of claim 1 wherein generating message alerts in the message notification system according to settings defined by said users comprises:
   defining a filter setting;
   applying the filter to said communications routed through the message notification system; and
   generating message alerts based on the filter setting to distinguish said received communications.

8. The method of claim 7 wherein defining a filter includes defining a filter to be applied to email communications.

9. The method of claim 7 wherein defining a filter includes defining a filter to be applied to voicemail messages.

10. The method of claim 7 wherein defining a filter includes defining a filter to be applied to facsimile messages.

11. The method of claim 7 wherein defining the filter setting comprises defining a key word, and wherein applying the filter comprises searching for the key word in said communications routed through the message notification system.

12. A method of supporting device independent messaging notification, the method comprising:
   receiving a plurality of communications, including telephony and email communications, on behalf of users via a plurality of point of presence (POP) communications servers wherein receiving includes receiving the plurality of communications from a plurality of different types of message sending devices;
   converting all received communications, including said telephony and email communications, as necessary into a format compatible with a data network linking the POP communication servers;
   routing all of said converted communications through POP communication servers via the data network to a message notification system;
   generating message alerts in the message notification system according to settings defined by said users; and
   routing the message alerts through the POP communications servers via the data network to communication devices associated with said users.

13. One or more computer-readable media having computer-executable instructions for performing a method of supporting device independent messaging notification comprising:
   receiving a plurality of communications, including telephony, email and facsimile communications, on behalf of users via a telephony server and first and second point of presence (POP) data communications servers;
   converting all received communications, including said telephony, email and facsimile communications, as necessary into a format compatible with a data network linking said POP data communication servers;
   routing all of said converted telephony, email and facsimile communications through the POP data communications servers via the data network to a message notification system;
   generating message alerts in the message notification system according to settings defined by said users; and
   routing the message alerts through the POP data communication servers via the data network to communication devices associated with said users.

14. One or more computer-readable media having computer-executable instructions for performing a method of supporting device independent messaging notification comprising:
   receiving a plurality of communications, including telephony and email communications, on behalf of users via a plurality of point of presence (POP) communications servers, wherein receiving includes receiving the plurality of communications from a plurality of different types of message sending devices;
   converting all received communications, including said telephony and email communications, as necessary into a format compatible with a data network linking the POP communication servers;
   routing all of said converted communications through POP communication servers via the data network to a message notification system;
   generating message alerts in the message notification system according to settings defined by said users; and
   routing the message alerts through the POP communications servers via the data network to communication devices associated with said users.

* * * * *